United States Patent [19]

Bresciani

[11] Patent Number: 4,633,848
[45] Date of Patent: Jan. 6, 1987

[54] ENDLESS SAW AND METHOD FOR CUTTING ANNULAR ROCK BODIES

[75] Inventor: Paolo Bresciani, Massa, Italy

[73] Assignee: Tongiani Domenico S.p.A., Massa, Italy

[21] Appl. No.: 710,665

[22] Filed: Mar. 12, 1985

[30] Foreign Application Priority Data

Mar. 14, 1984 [IT] Italy ............................... 18305 A/84

[51] Int. Cl.$^4$ ............................................. B28D 1/08
[52] U.S. Cl. ........................................ 125/21; 125/10
[58] Field of Search ..................................... 125/10, 21

[56] References Cited

U.S. PATENT DOCUMENTS

| | | |
|---|---|---|
| 1,017,207 | 2/1912 | Eggers ................................. 125/21 |
| 2,803,239 | 8/1957 | D'Avaucourt ....................... 125/21 |
| 2,860,862 | 11/1958 | Horton ................................. 125/21 |
| 3,299,877 | 1/1967 | Grage ................................... 125/21 |

Primary Examiner—Harold D. Whitehead
Attorney, Agent, or Firm—Fleit, Jacobson, Cohn & Price

[57] ABSTRACT

A method of making annular bodies from marble blocks comprises the step of cutting through a marble block set into rotation about one axis using a saw wire stretched through said block in spaced apart relationship with said axis.

3 Claims, 15 Drawing Figures

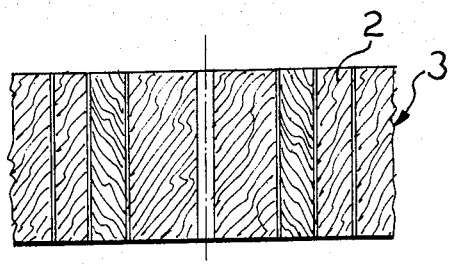
Fig-4
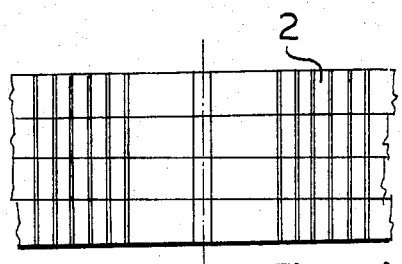
Fig-11
Fig-12
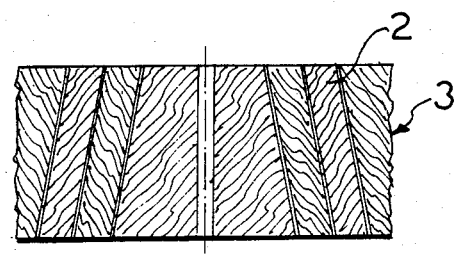
Fig-5
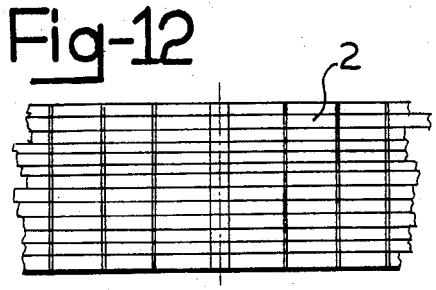
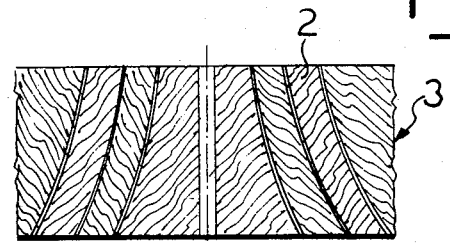
Fig-6
Fig-3
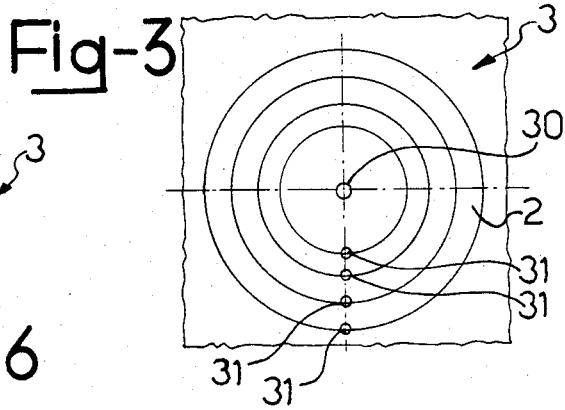
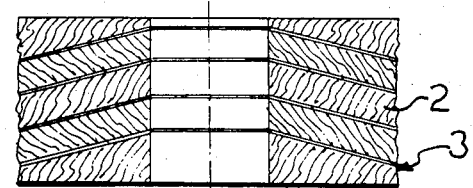
Fig-7
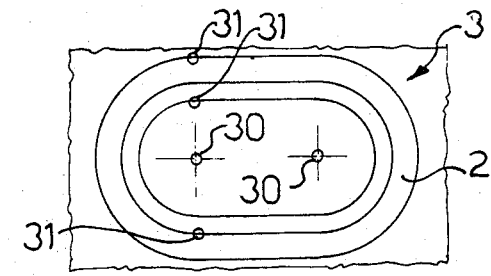
Fig-10

ENDLESS SAW AND METHOD FOR CUTTING ANNULAR ROCK BODIES

BACKGROUND OF THE INVENTION

This invention relates to a method of making annular bodies from rock material blocks, such as marble, granite, and stone blocks.

While on the one hand, there exists a demand for annular bodies of the kind of annular bodies of marble and the like rock materials which are formed with either cylindrical, or conical, or hyperbolic inner and/or outer surfaces, well known on the other hand, is the great difficulty encountered in producing them.

In order to make annular bodies out of a marble block, a hand carving method may be presently followed which requires, however, craftmanship of a high degree and much time.

Also viable is a mechanical method whereby the block center portion is first hollowed out, e.g. by drilling, and then subjected to rough and finish turning cuts, applied both inside and out, optionally by having the tool bit guided around a template.

The latter scheme practically results in frequent breakage of the marble block being processed, especially where the annular body to be produced is a thin one. This also calls for careful processing, and hence, increased time consumption.

SUMMARY OF THE INVENTION

The technical problem underlying this invention is that of providing a method of making annular bodies from rock material blocks, which can obviate the prior disadvantages outlined in the foregoing.

The idea on which the invention stands is that of using a tool comprising a saw wire, which may be either diamond-clad or helicoidal and is led through a rock material block set into rotation about one axis, to effect in said block concentrical, cylindrical, conical, or hyperbolic cuts about said axis.

Based upon the above idea, and to solve the aforesaid technical problem, this invention provides a method of making annular bodies from rock material blocks, characterized in that it comprises the steps of positioning the block on a rotary block-holding table, driven rotatively about one axis, drilling a hole through said block in spaced apart relationship with said axis, threading a saw wire through said hole, imparting a cutting motion to said saw wire, and feeding forward said block rotatively about said axis.

The invention is also concerned with a machine for making annular bodies from rock material blocks, characterized in that it comprises a bed, a rotary block-holding table mounted on said bed for rotation about one axis and being acted upon by a motor means, and an endless saw wire having a working run thereof stretched between two pulleys carried on said bed in a direction extending at a distance from said axis.

BRIEF DESCRIPTION OF THE DRAWINGS

Further features and the advantages of the method according to this invention will be apparent from the following description of an illustrative embodiment thereof, in conjunction with a machine shown in the accompanying drawings, where:

FIG. 3 shows a rock material block during one step of this method;

FIGS. 4, 5, 6, 7, 8 and 9 depict examples of annular bodies as made from a rock material block in conformity with the method of this invention;

FIG. 10 shows a rock material block during one step of this method, according to a modified embodiment thereof; and FIGS. 11, 12, 13, 14, and 15 illustrate further examples of annular bodies made fro a rock material block according to the invention.

DESCRIPTION OF THE PREFERRED EMBODIMENTS

Figure 1:
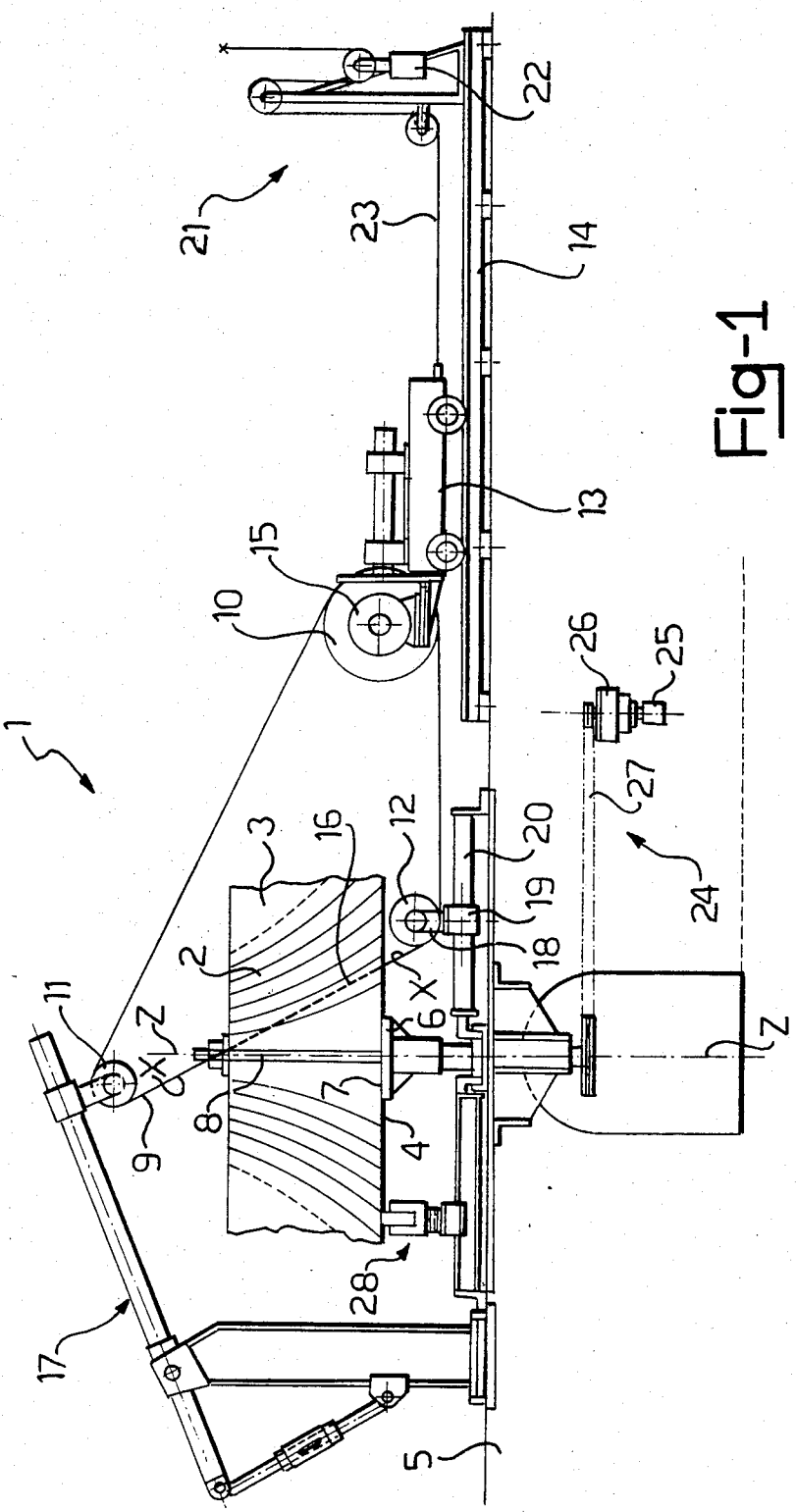
FIG. 1 is an elevation view showing diagramatically a machine for implementing the inventive method.

With reference to the drawing views, generally indicated at 1 is a machine according to the invention for making annular bodies 2 from a rock material block, such as a block of marble, stone, granite, and the like, having a flat bottom surface 4.

The machine 1 comprises a bed 5 and a rotary block-holding table 6, which is supported on the bed 5 for rotation about a vertical axis, indicated at Z—Z, through conventional rolling bearings or anti-friction bushings.

The table 6 is formed with a flat top surface 7 whereon the block 3 is arranged to bear with its flat undersurface 4. Preferably, a tie rod 8, extending along the axis Z—Z, would be arranged to secure the block 3 on the table 6.

The machine further comprises a tool in the form of an endless saw wire 9, known per se and preferably diamond-clad or helicoidal, which is trained in a closed loop configuration around three pulleys 10, 11 and 12 carried on the bed 5 in a manner to be explained hereinbelow.

More specifically, the pulley 10 is mounted for a castoring action on a carriage 13 which is movable, in a guided running fashion, along a guide or runway 14 attached to the bed 5 and extending horizontally in a substantially radial direction to the axis Z—Z.

The pulley 9 is driven by a motor 15 to impart a cutting motion to the saw wire 9.

The pulleys 11 and 12 are idlers arranged to define a working run of the saw wire 9, indicated at 16 and stretched therebetween, which run lies in a direction X—X in spaced apart relationship with the axis Z—Z, e.g. a skewed relationship. This relationship may be adjusted as explained hereinafter.

The pulley 11 is supported for a castoring action on an articulated arm 17 which is, in turn, supported on the bed 5 and extends cantilever-fashion at a position overlying the table 6.

The pulley 12 is carried laterally of the table 6, for a castoring action, by means of a bracket 18 which is mounted on a slider 19. The slider 19 may be positioned adjustably along a slide bar 20 which is secured to the bed 5 at a preset location thereon.

By changing the inclination angle of the articulated arm 17, changing the position of the slider 19 along the slide bar 20, and changing the location of the slide bar 20 on the bed 5, it becomes possible to vary the positions of the pulleys 11 and 12, and hence, the direction of the working run X—X relatively to the axis Z—Z.

The machine 1 further includes a take-up assembly 21 for the saw wire 9, which acts on the carriage 13 to constantly urge it, with a preset bias force, away from the pulleys 11 and 12. In the example considered, the take-up assembly 21 comprises a counterweight 22 and a rope 23 stretched between the carriage 13 and bed 5 and kept taut by said counterweight 22.

In addition, the machine 1 includes a motor means 24 for rotatively driving the table 6 in a rotary feeding motion about the axis Z—Z at a low speed. In the example considered, the motor means 24 comprises an electric motor 25 which is connected drivingly to the table 6 via a reduction gear 26 and belt-and-pulley drive 27.

Advantageously, the machine 1 comprises a bearing arrangement in the form of idler rollers 28 distributed around the axis Z—Z and being attached to the bed 5 in an adjustably positionable manner for a purpose to be explained hereinafter.

Figure 2:
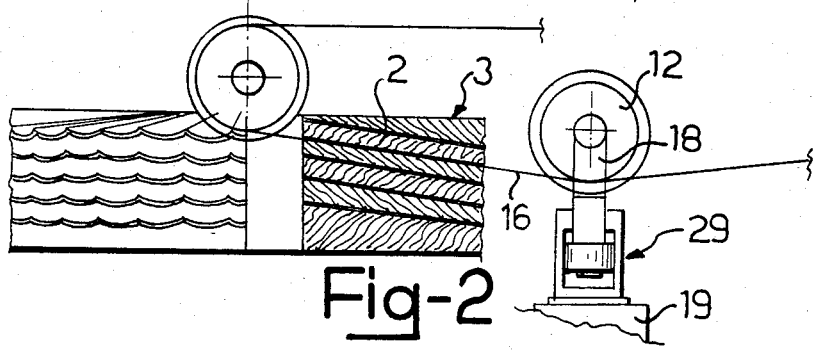
FIG. 2 is an enlarged scale detail view of a modified embodiment of the machine of FIG. 1.

In a modified embodiment shown in FIG. 2, the bracket 18 is mounted on the slider 19 for a guided sliding movement in a vertical direction, and is subjected to the action of a hydraulic cylinder 29.

A method will be now described of making annular bodies out of rock material blocks, according to the invention, as implemented by means of the machine just described.

As a first step of the method, there are drilled through the rock material block 3 a center hole 30 for the tie rod 8 and plural holes 31 spaced apart from the hole 30, e.g. set askew relatively thereto (see FIG. 3).

The block 3 is laid with its undersurface 4 resting centrally on the rotary table 6 and peripherally on the idler rollers 28. Thereafter, it is secured to the table 6 by means of the tie rod 8.

At this point, and in conformity with a successive step of the method, the working run 16 of the saw wire 9 is threaded through the outermost of the holes 31 and stretched therethrough by suitably varying the positions of the pulleys 11 and 12.

Now the motor 15 is energized to impart a cutting motion to the saw wire 9, and the motor 25 is energized to impart to the block 3 a rotary feeding motion relative to the working run 16 of the saw wire 9.

On the block completing one full revolution, an annular cut will be performed through the block 3 about the axis Z—Z, and a peripheral portion of the block can now be removed.

At this pont, by going through the same procedure as described above in succession at the remaining holes 31, successive concentrical cuts are executed, each of such cuts providing an annular body 2 which can be removed.

Prior to each cut, the idler rollers 28 would be positioned such that the outer peripheral portion of the block 3 lying outwardly of the working run 16 of the saw wire 9, or the annular body being cut out externally of said working run, can rest thereon. Alternatively, to provide support for said outer portion or annular body, stirrups may be applied progressively to the block during the cut, or spacers may be inserted progressively into the cut downstream of the saw wire.

Figure 9:
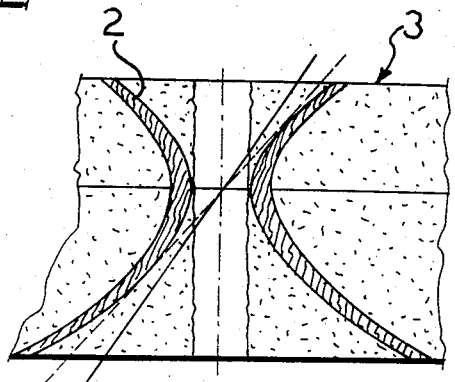
Figure 8:
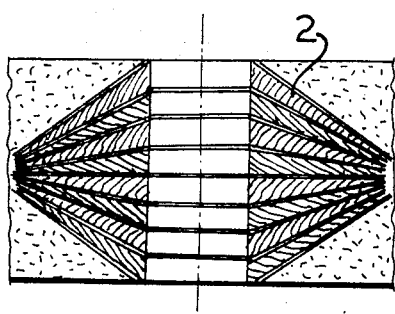

By changing the positions of the pulleys 11 and 12 on opposed sides of the block, and accordingly, changing the lay of the working run 16 of the saw wire 9 relative to the axis Z—Z, cylindrical (see FIG. 4), conical (see FIG. 5), hyperbolic (see FIG. 6), dimpled (see FIG. 7), staggered dimple (see FIG 8), and double hyperbolic (see FIG. 9) annular bodies may be obtained.

It should be also noted that the above method may be repeated twice on one block (see FIG. 10), when laid out with two discrete holes for the tie rod 8 to permit two successive settings of the block on the table 6. In that case, rotation of the table 6 for each setting of the block would be limited to a half-revolution.

The method may also be implemented by shifting, during the block forward feed movement stage, the working run 16 alternatively between two positions, through displacement of the pulley 12 alternately between two positions by operation of the hydraulic cylinder 28. Thus, wavy annular bodies can be made such as cupped bodies of shell-like configuration (see FIG. 2).

A main advantage of the inventive method resides in that it provides for the making in a quick and reliabe manner of annular bodies which may have a small thickness dimension.

By virtue of the block being rotated at a relatively low rpm, cracking of the marble is virtually eliminated. Furthermore, each cut executed through the marble provides in one operation both the outer surface of one annular body and inner surface of an adjacent annular body.

An added advantage of the method of this invention is that it enables a plurality of annular bodies to be cut out of a single marble block, thereby the block is fully utilized with a minimum of waste.

It should be noted that the individual annular bodies thus cut out, may be utilized as such or as blanks for subsequent processing, such as outer profile turning, relief turning, polishing, cutting into segments, on quite conventional equipment.

Also noteworthy is that the machine according to the invention lends itself for some of the processing operations specified in the foregoing, so long as it is appropriately provided with the cited conventional equipment.

Figure 13:
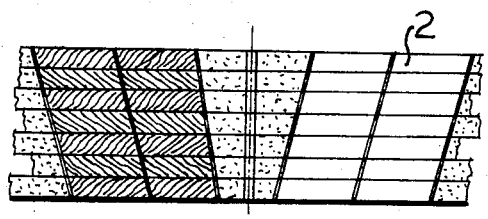

It should be further pointed out that plural cuts may be made through a block formed of a number of superimosed slabs (see FIGS. 11, 12, 13).

Figure 15:
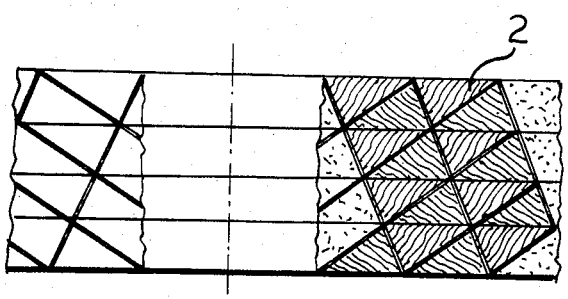
Figure 14:
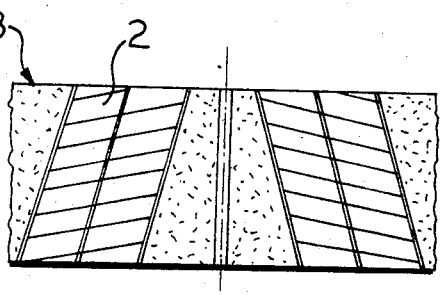

The machine of this invention can also execute through a block dual pluralities of cuts, such as conical cuts and dimple cuts crossing one another (see FIG. 14), as well as various combinations of the above-mentioned cuts, e.g. criss-crossing cuts through superimposed or stacked slabs (see FIG. 15).

It is understood that the method and machine herein may be modified and changed in various ways by persons skilled in the art, contingent on specific requirements, without departing from the true scope of the invention as defined in the appended claims.

I claim:

1. A method for cutting annular bodies from a stone block, said method comprising: providing in a rock material block a mounting hole and a saw hole spaced from the mounting hole, clamping the block to a rotatable surface by passing a clamping bolt through the mounting hole, providing an endless saw wire, leading the saw wire through the saw hole that passes through the rock material block, supporting the wire to define a working run that extends through the saw hole in the block, causing the wire to move along the working run, setting the block into rotation about a vertical axis while the saw wire is moving along its working run to effect in said block cuts about said axis of rotation.

2. A method of making annular bodies from rock material blocks, said method comprising the steps of drilling a first hole through said block, drilling a second hole through said block, said second hole spaced from said first hole, securing the block on a rotary block-holding table by passing a tie rod through said first hole, said table rotatable about a vertical axis, threading a saw wire through said second hole, imparting a cutting motion to said saw wire, and moving said block rotatively about said vertical axis of rotation.

3. A machine for making annular bodies from rock material blocks, said machine comprising: a bed, a rotary block-holding table mounted on said bed for rotation about a vertical axis, rod means extending along said vertical axis for securing a block to said table, motor means for rotating said table, an endless saw wire having a working run thereof stretched between two spaced pulleys, one of which pulleys is carried on said bed and the other of said pulleys supported above said table, said wire extending between said pulleys in a direction skewed from and spaced from said vertical axis of rotation, and roller means for supporting said block, said roller means positioned outwardly of said working run of said saw wire, relative to the axis of rotation.

* * * * *